(12) United States Patent
Velasco Valcke

(10) Patent No.: US 10,295,203 B2
(45) Date of Patent: May 21, 2019

(54) DEVICE FOR EXTRACTING WATER FROM THE ENVIRONMENT

(71) Applicant: PANACEA QUANTUM LEAP TECHNOLOGY LLC, Dallas, TX (US)

(72) Inventor: Francisco Javier Velasco Valcke, Bogotá (CO)

(73) Assignee: Panacea Quantum Leap Technology LLC, Dallas, TX (US)

( * ) Notice: Subject to any disclaimer, the term of this patent is extended or adjusted under 35 U.S.C. 154(b) by 137 days.

(21) Appl. No.: 15/306,425

(22) PCT Filed: Apr. 25, 2015

(86) PCT No.: PCT/IB2015/053012
§ 371 (c)(1),
(2) Date: Jan. 16, 2017

(87) PCT Pub. No.: WO2015/162599
PCT Pub. Date: Oct. 29, 2015

(65) Prior Publication Data
US 2017/0184318 A1   Jun. 29, 2017

(30) Foreign Application Priority Data

Apr. 22, 2014 (CO) .................................. 14-085793

(51) Int. Cl.
*B01D 53/26* (2006.01)
*F24F 3/14* (2006.01)
(Continued)

(52) U.S. Cl.
CPC ........ *F24F 3/1417* (2013.01); *B01D 53/1425* (2013.01); *B01D 53/18* (2013.01);
(Continued)

(58) Field of Classification Search
CPC .................. B01D 2252/10; B01D 53/14; B01D 53/1425; B01D 53/18; B01D 53/263; E03B 3/28; F24F 2003/144; F24F 3/1417
See application file for complete search history.

(56) References Cited

U.S. PATENT DOCUMENTS

| 3,634,998 A | 1/1972 | Patterson |
| 6,216,483 B1 * | 4/2001 | Potnis ................. B01D 53/263 62/271 |

(Continued)

FOREIGN PATENT DOCUMENTS

| CA | 895847 A | 3/1972 |
| EP | 0016470 A1 | 10/1980 |

(Continued)

*Primary Examiner* — Cabrena Holecek
(74) *Attorney, Agent, or Firm* — The Morales Law Firm, LLC; Joseph L. Morales

(57) ABSTRACT

The present invention corresponds to a device for extracting water from the environment by means of a liquid desiccant. The device comprises a means for capturing water from the environment using a liquid desiccant, an extraction chamber, a first duct through which liquid desiccant with water flows from the capture means to the extraction chamber, a second duct through which liquid desiccant flows from the extraction chamber to the capture means, a reservoir for depositing water extracted from the liquid desiccant in the extraction chamber, a third duct through which water flows from the extraction chamber to the reservoir, a means to create a vacuum within the extraction chamber, and a control device that controls the heating element. The extraction chamber comprises a container located at the bottom of the extraction chamber, in which the water captured by the liquid desiccant is extracted and a heating element located within the container.

19 Claims, 3 Drawing Sheets

(51) Int. Cl.
  *B01D 53/14* (2006.01)
  *B01D 53/18* (2006.01)
  *E03B 3/28* (2006.01)

(52) U.S. Cl.
  CPC .............. *B01D 53/263* (2013.01); *E03B 3/28* (2013.01); *B01D 53/14* (2013.01); *B01D 2252/10* (2013.01); *F24F 2003/144* (2013.01); *Y02A 20/109* (2018.01)

(56) References Cited

U.S. PATENT DOCUMENTS

| | | |
|---|---|---|
| 2006/0130654 A1 | 6/2006 | King |
| 2010/0013112 A1 | 1/2010 | Forkosh |
| 2010/0090356 A1 | 4/2010 | Sines et al. |
| 2013/0318790 A1 | 12/2013 | Becze et al. |

FOREIGN PATENT DOCUMENTS

| | | |
|---|---|---|
| JP | S61164621 A | 7/1986 |
| JP | 61259728 A2 | 11/1986 |
| JP | S62023418 A | 1/1987 |
| WO | 2012082093 A1 | 6/2012 |

\* cited by examiner

DEVICE FOR EXTRACTING WATER FROM THE ENVIRONMENT

FIELD OF THE INVENTION

The present invention relates to dehumidifiers, and specifically, to systems that capture water from the air by means of liquid desiccants.

DESCRIPTION OF THE PRIOR ART

The goal of dehumidification processes is to absorb humidity from the environment using materials that try to balance the humidity level of their environment with the humidity level of said materials. When it is also necessary to counteract high latent moisture loads, desiccants are used to decrease the moisture content of the air in thermal processes. Desiccants are chemical substances that have a high affinity for humidity, that is to say, that are capable of extracting water vapor from the air, in comparatively large amounts relative to their weight and volume. The physical process that allows for the retention or release of humidity is the difference in vapor pressure between the surface of the desiccant and ambient air. Their water retention properties are due to surface adsorption and capillary condensation. Desiccants can be classified as absorbents, which experience chemical changes when they retain or release moisture, or as adsorbents, which retain or release moisture without experiencing chemical changes; that is, the only change is the addition of the mass of water vapor to the desiccant. Desiccants may be solid or liquid. Many liquid desiccants are absorbent.

The dehumidification of air by means of desiccants occurs when the vapor pressure at the surface of the desiccant is lower than the vapor pressure of ambient air. When the water vapor is adsorbed, the vapor pressure in the desiccant increases until it reaches equilibrium. This occurs when the vapor pressure in the desiccant and in the air are equal. In order to reuse the desiccant, it is necessary to regenerate it, that is, it is necessary to remove the moisture therefrom. This regeneration, or release of adsorbed water vapor from the desiccant, is accomplished by heating it in order to increase its vapor pressure, thereby expelling the moisture from the desiccant.

The prior art proposes systems for lowering environmental humidity based on the use of liquid desiccant materials, wherein the liquid desiccant captures vapor present in the atmosphere, and subsequently releases it when heated. A disclosure that provides evidence for the above is presented in patent US2010003112 A1, which discloses a method and a system for manipulation of the water present in a fluid.

This antecedent describes a cyclical method and system of loading and unloading the desiccant material for the purpose of capturing and releasing moisture from the air. However, it is evident that the system does not retrieve water vapor, and thus, bears a closer resemblance to a system for loading a fluid with water vapor, that is, a humidifier. This system requires significant power consumption to capture and transfer moisture, using between two and three heat exchangers (depending on the configuration of the embodiment) and three pumps.

DESCRIPTION OF THE FIGURES

The invention shall be described by means of the following figures, in which the reference numbers are included to identify the constituent parts.

BRIEF DESCRIPTION OF THE INVENTION

Figure 1:
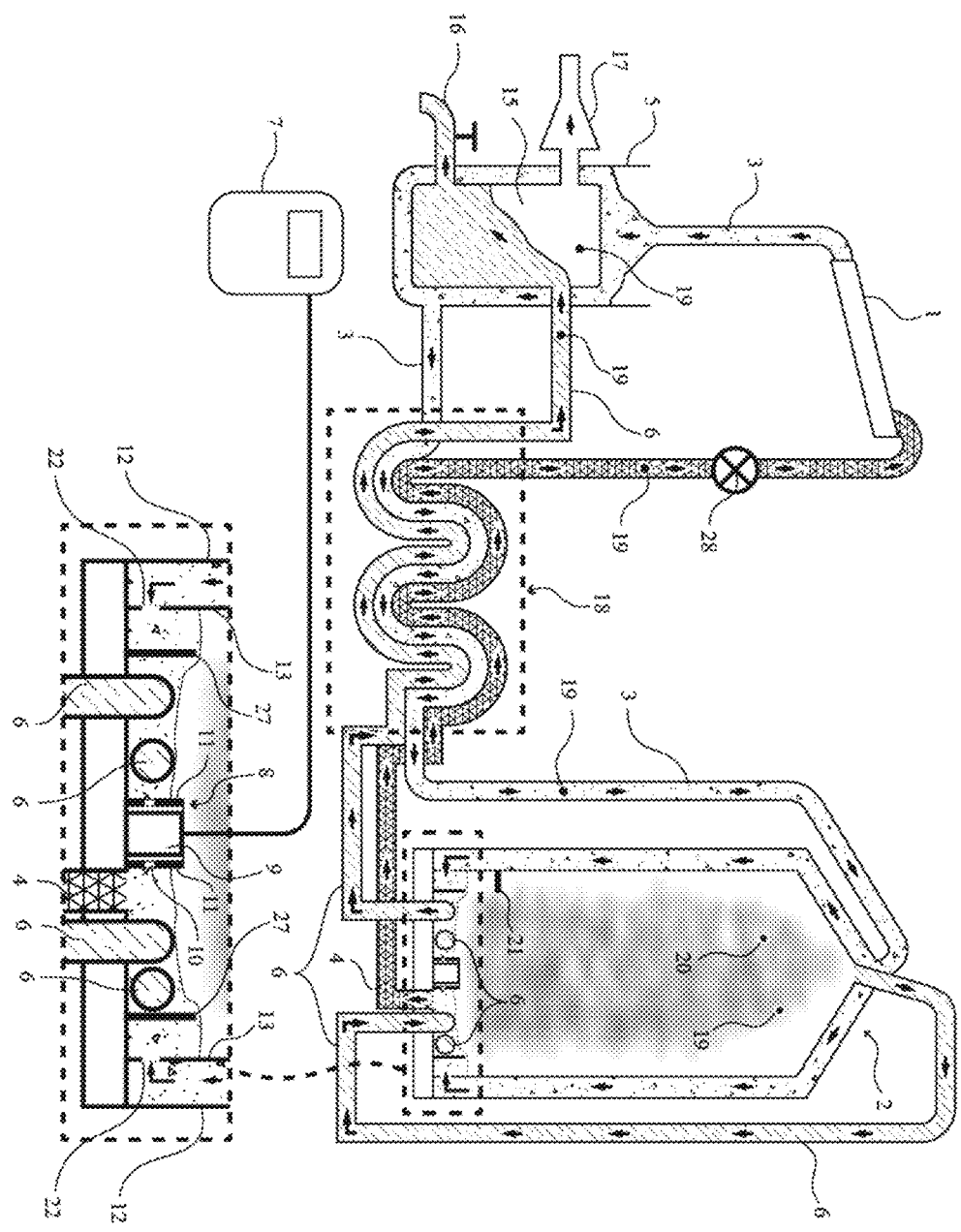
FIG. 1. Corresponds to one embodiment of the invention.

The present invention is geared toward providing a simple, effective and affordable process to extract water from ambient air, based on a device that utilizes liquid desiccants. The liquid desiccant captures water from the environment in a capture means and transfers it to an extraction chamber, wherein the water captured by the liquid desiccant is extracted. Containers that contain heating elements are placed at the bottom of the extraction chamber. The extracted water is deposited in a reservoir. The liquid desiccant from which water was extracted is transferred from the extraction chamber to the capture means, where it captures water and repeats the cycle again, constituting a continuous operation.

DETAILED DESCRIPTION OF THE INVENTION

The present invention corresponds to a device for extracting water from the environment by means of a liquid desiccant. The device of the present invention can extract water vapor from the air present in the environment. Consistent with FIG. 1, the device of the present invention is essentially composed of:

- a capture means (1),
- an extraction chamber (2),
- a tube (3) through which the liquid desiccant with water flows from the capture means (1) to the extraction chamber (2),
- a tube (4) through which the liquid desiccant flows from the extraction chamber (2) to the capture means (1),
- a reservoir (5),
- a tube (6) through which the water flows from the extraction chamber (2) to the reservoir (5), and
- a control device (7).

The capture means (1) corresponds to the component of the device in which the liquid desiccant captures water from the environment. According to FIGS. 1 and 2, the capture means (1) is an inclined tray (which may comprise spirals or partitions) through which the liquid desiccant flows. In one embodiment of the invention (not illustrated herein), the capture means (1) is a reservoir in which the liquid desiccant is placed; inside the reservoir, the ambient air current flows and comes into contact with the desiccant for the purpose of capturing water. The capture means (1) allows the desiccant to come into contact with the environment in order to capture water, resulting in desiccant with water. In one embodiment of the invention, the capture means comprises a fan, a compressor or a turbine, which make the ambient air flow toward the tray on which the liquid desiccant flows or toward the reservoir in which the liquid desiccant is placed. The person having ordinary skill in the art would understand that variations of the capture means (1) can be designed so as to optimize the capture of water from the environment, depending on the needs of the device.

Figure 2:
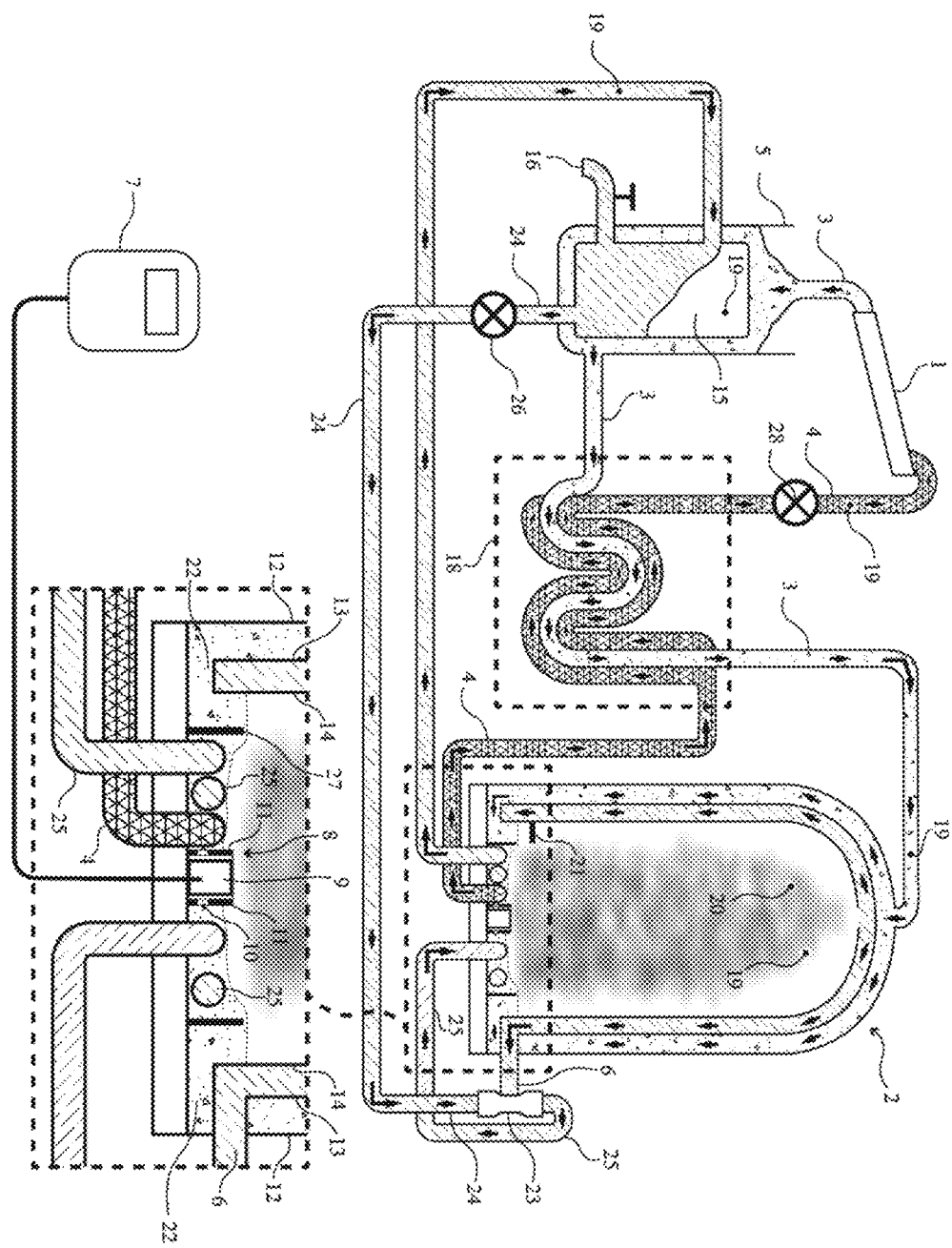
FIG. 2. Corresponds to another embodiment of the invention.

According to FIGS. 1 and 2, the liquid desiccant with water flows through tube (3) from the capture means (1) to the extraction chamber (2).

According to FIGS. 1 and 2, the following are placed inside the extraction chamber (2):
- a container (8), and
- a heating element (9).

According to FIG. 1, the container (8) has an open top, has less volume than the extraction chamber (2) and is located at the bottom of the extraction chamber (2). The container (8) has holes (10) at the bottom of its lateral wall (11), through which the liquid desiccant with water flows toward the interior of the container (8). The heating element (9), for example, a resistor, is placed inside the container (8), which provides heat to extract the water captured in the liquid desiccant with water by evaporation and boiling. When the liquid desiccant with water that enters the container (8) is heated, the physical process of boiling occurs, in which the water captured by the liquid desiccant transitions to the gas phase, and bubbles form, which expel the liquid desiccant through the top of the container (8), which is open. In one embodiment of the invention, the lateral wall (11) is composed of thermal insulation material. In one embodiment of the invention, the extraction chamber (2) comprises a plurality of containers (8) and a heating element (9) for each container (8). The internal volume of the container (8) and of the heating element (9) must be similar, and preferably with the same shape, in order to establish a separation between the container (8) and the heating element (9) through which the liquid desiccant with water flows as a thin film, which optimizes the extraction of water. The ratio of the internal volume of the heating element (9) and the container (8) is between 30% and 95%, preferably between 70% and 95%.

In one embodiment of the invention, the top of the container (8) has a hole having a smaller area than the cross-sectional area of the container (8). When the water boils, bubbles form, which expel the liquid desiccant through the hole, and due to the section change of the flow of liquid desiccant, the liquid desiccant's velocity increases and finally spreads to the interior of the extraction chamber (2) until it settles at the bottom. In other embodiments of the invention, a mesh with holes, a diffuser or a nozzle is placed at the top of the container (8).

According to FIG. 1, the extraction chamber (2) is double-jacketed, wherein the liquid desiccant with water flows between the external jacket (12) and the internal jacket (13) when it enters the extraction chamber (2). The internal jacket (13) has holes (22) on the bottom, through which the liquid desiccant with water flows toward the bottom of the extraction chamber (2). The internal jacket (13) is composed of a thermal insulation material.

According to FIG. 2, in another embodiment of the invention, the extraction chamber (2) is triple-jacketed, wherein the liquid desiccant with water enters through the top of the extraction chamber (2) and flows between the external jacket (12) and the internal jacket (13) until it flows to the bottom of the extraction chamber (2). The holes (22) are located at the bottom of the internal jacket (13). The configuration of the container (8) and the heating element (9) in this embodiment is the same as that of the previously described embodiment. Water vapor flows through the interior of the extraction chamber (2) toward the top, entering the boundary between the internal jacket (13) and the second internal jacket (14), and flowing toward the bottom of the extraction chamber (2) within this boundary, for their subsequent exit from the extraction chamber (2) through tube (6). The second jacket (14) is composed of an insulating material. The water vapor that flows between the internal jacket (13) and the second internal jacket (14) transfers heat to the liquid desiccant with water that flows between the external jacket (12) and the internal jacket (13) and therefore, the temperature of the liquid desiccant with water increases while the temperature of the water vapor decreases, allowing it to condense and simultaneously creating negative pressure within the extraction chamber (2).

According to FIGS. 1 and 2, the wall (27) is placed at the bottom of the extraction chamber (2). The wall (27) runs along the periphery of the bottom of the extraction chamber (2), forming a closed boundary similar to that of the container (8), but without the holes (10). The container (8) is located within the boundary formed by the wall (27). The liquid desiccant with water enters the bottom of the extraction chamber (2) by first filling the external volume outside of the boundary formed by the wall (27). Subsequently, when the level of liquid desiccant with water exceeds the height of the wall (27), it enters the interior side of the boundary formed by the wall (27), to then enter the container (8).

The pressure in the extraction chamber (2) is lower than the atmospheric pressure. Preferably, the extraction chamber (2) is coated by a thermal insulation material.

According to FIGS. 1 and 2, the liquid desiccant, obtained by extracting the water from the liquid desiccant with water within the container (8), flows toward the capture means (1) through tube (4). Along tube (4), a pump (28) is connected, which pumps the liquid desiccant toward the capture means (1).

According to FIGS. 1 and 2, the water extracted in the extraction chamber (2) flows through tube (6) toward the reservoir (5). According to FIG. 1, the reservoir (5) has a closed tank (15), located therein. Tube (6) is connected to the tank (15), thereby transferring the water extracted from the extraction chamber thereto. Liquid desiccant with water flows into the space formed between the tank (15) and the reservoir (5), and thus, the extracted water in the tank (15) transfers heat to the liquid desiccant with water before it enters the extraction chamber (2). In this embodiment of the invention, the tank (15) has a valve (16).

According to FIG. 1, the tank (15) is connected to the compressor (17) such that a vacuum is created within the tank (15), thereby creating a suction force on the water that flows through tube (6), and therefore, establishing negative pressure within the extraction chamber (2).

In one embodiment of the invention, a pump is placed along tube (6), which exerts suction on the water in order to deposit it in the reservoir (5), and therefore results in negative pressure within the extraction chamber (2). The pump in this embodiment produces the same effect as the compressor (17) described in the embodiment corresponding to FIG. 1.

According to FIG. 2, tube (6) is connected to the Venturi tube (23). Tube (6) is connected to the high-velocity, low-pressure area of the Venturi tube (23). Tube (24), the other end of which is connected to the tank (15), is connected to the input of the Venturi tube (23). Tube (25), the other end of which is connected to the tank (15), is connected to the output of the Venturi tube (23). The pump (26) is connected along tube (24), which suctions water from the tank (15), which flows toward the Venturi tube (24), suctioning the water vapor that flows through tube (6), and subsequently flows toward the tank (15) through tube (25). The tank (15) has a valve (16) by means of which water is provided.

According to FIG. 1, tube (6), through which the extracted water flows, enters the bottom of the extraction chamber (2), specifically, the space between the interior side of the boundary formed by the wall (27) and the exterior side of the container (8), submerged in the volume of liquid desiccant with water contained within said boundary. In this situation, tube (6) transfers heat to the liquid desiccant with water, thereby increasing the latter's temperature and, at the same time, the evaporated water condenses when its temperature decreases. The geometry defined by the path of tube (6) into the extraction chamber (2) can be U-shaped, spiral-shaped or of any other shape that allows for an increased area of contact between tube (6) and the liquid desiccant with water.

Figure 3:
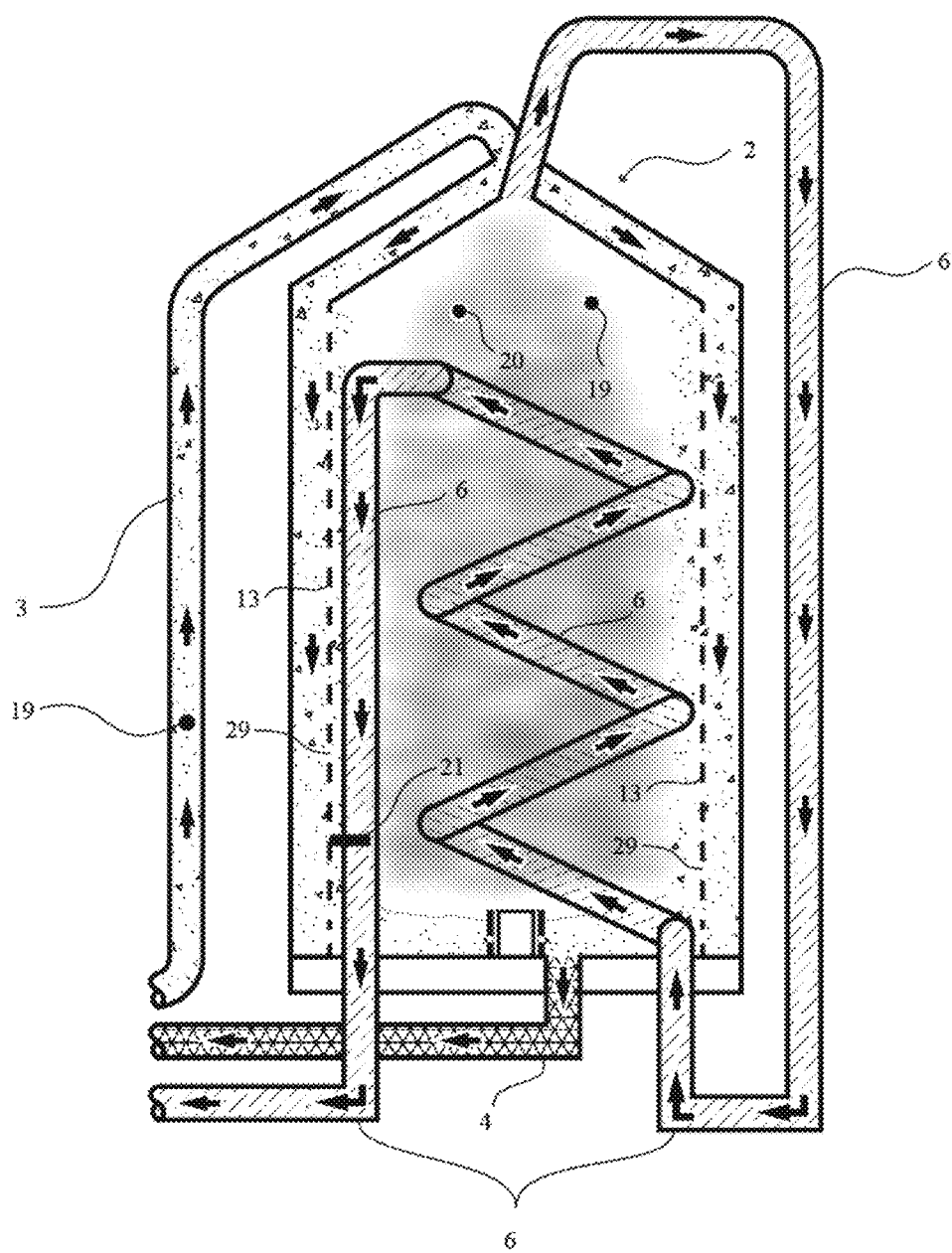
FIG. 3. Corresponds to one embodiment of the extraction chamber of the invention.

According to FIG. 3, in one embodiment of the invention, in which the extraction chamber (2) is double-jacketed, the internal jacket (13) has holes (29) in its boundary, through which the liquid desiccant with water flows toward the interior of the extraction chamber (2). In this embodiment of the invention, tube (6) enters the extraction chamber (2), traversing the interior of the extraction chamber (2) to be moistened by the liquid desiccant with water that drains by gravity from the holes (29) toward the bottom of the extraction chamber (2). The liquid desiccant with water that comes into contact with tube (6) captures the heat of the water vapor that flows through tube (6). When the liquid desiccant with water is heated, part of the water contained therein evaporates and furthermore, the amount of thermal energy required to extract water from the liquid desiccant with water is reduced. In one variation of this embodiment (not illustrated herein), tube (6) is also submerged in the liquid desiccant with water located at the bottom of the extraction chamber (2). In one variation of this embodiment of the invention (not illustrated herein), a sprinkler or sprayer is placed inside the extraction chamber (2), through which the liquid desiccant with water is delivered to the interior of the extraction chamber (2) and moistens tube (6), because of which tube (6) transfers heat to the liquid desiccant with water that comes into contact therewith.

According to FIG. 2, tube (25), through which the extracted water and the water suctioned from the tank (15) flow, enters the bottom of the extraction chamber (2), specifically, the space between the interior side of the boundary formed by the wall (27) and the exterior side of the container (8), submerged in the volume of liquid desiccant with water. In this situation, tube (25) transfers heat to the liquid desiccant with water, thereby increasing the latter's temperature.

In another embodiment of the invention (not illustrated herein), tubes (6) and (25) do not enter the bottom of the extraction chamber (2), and in this situation, it is not necessary to employ the wall (27) at the bottom of the extraction chamber (2).

If tubes (6) and (25) traverse the external boundary of the extraction chamber (2) before entering therein, the tubes are preferably coated with a thermal insulation material to prevent the transfer of heat to the environment.

According to FIG. 1, tube (3), tube (4) and tube (6) comprise a heat exchanger (18). In the heat exchanger (18) of this embodiment of the invention, tube (6), through which the water extracted in the extraction chamber (2) flows toward the reservoir (5), and tube (4), through which the liquid desiccant from the extraction chamber (2) flows toward the capture means (1), transfer heat to tube (3), through which the liquid desiccant with water flows from the capture means (1) toward the extraction chamber (2).

According to FIG. 2, tube (3) and tube (4) comprise a heat exchanger (18). In the heat exchanger (18) of this embodiment of the invention, tube (4), through which the liquid desiccant from the extraction chamber (2) flows toward the capture means (1), transfer heat to tube (3), through which the liquid desiccant with water flows from the capture means (1) toward the extraction chamber (2).

In another embodiment of the invention (not illustrated herein), the exchanger (18) is composed of tube (3) and tube (6).

Preferably, the heat exchanger (18) is coated by a thermal insulation jacket.

The various configurations of the exchanger, reservoir (5) with a tank (15), and/or entry of tube (6) or tube (25) into the extraction chamber (2), technically optimize the device of the invention, since the heat transferred by the heating elements (9), used to boil water, is harnessed to heat the liquid desiccant with water prior to entering the container (8) and therefore requiring the heating element (9) to provide a smaller amount of thermal energy in order to boil water in the extraction chamber (2).

Since the temperature of the liquid desiccant with water increases due to heat transfer, as described in the various configurations above, when the liquid desiccant with water enters the extraction chamber (2), water can be evaporated therefrom before entry into the container (8). The process of boiling the liquid desiccant with water occurs within the container (8).

In a preferred embodiment of the invention, the device possesses:
  temperature sensors (19) placed in the extraction chamber (2), the reservoir (5), tube (3), tube (4) and tube (6).
  a pressure sensor (20) placed in the extraction chamber (2), and
  a level sensor (21) placed in the extraction chamber (2).

According to FIGS. 1 and 2, the control device (7) is connected to the heating element (9), for the purpose of turning it on or off, based on the data provided by the temperature sensors (19), the pressure sensor (20) and the level sensor (21).

The temperature sensors (19), the pressure sensor (20) and the level sensor (21) are connected to the control device (7).

The following can also be connected to the control device (7) in order to control them:
  a pump (28) for pumping the liquid desiccant from the extraction chamber (2) to the capture means (1),
  the compressor (17), and
  the pump (26).

In one embodiment of the invention, the components of the device are covered with thermal insulation, except the control device (7) and the capture means (1).

The liquid desiccant to be used can be a compound selected from the group consisting of: a solution of a glycol, $CaCl_2$ brine, $NaCl_2$ brine, or a combination thereof.

If brine is used as the liquid desiccant:
  the salt concentration is kept between 25% and 35% w/w in the solution of liquid desiccant with water that flows from the capture means (1) toward the extraction chamber (2), and
  the salt concentration is kept between 35% and 70% w/w in the solution of liquid desiccant that flows from the extraction chamber (2) toward the capture means (1).

Example

The description of the device in the example is in accordance with FIG. 1.

The liquid desiccant used herein is a $CaCl_2$ brine.

The device capture water vapor from the environment by means of the liquid desiccant that flows in the capture means (1), which has an inclined tray configuration. The liquid desiccant has a concentration of 50% $CaCl_2$ and 50% water.

After capturing water, the new solution is termed "liquid desiccant with water" and has a concentration of 33.3% $CaCl_2$ and 66.6% water. The liquid desiccant with water flows through tube (4) toward the extraction chamber (2).

The extraction chamber (2) of the device is double-jacketed and is under less than atmospheric pressure. The liquid desiccant with water flows between the first jacket (12) and the second jacket (13) of the extraction chamber (2). The liquid desiccant with water flows to the bottom of the extraction chamber (2) through the holes (22) in the second jacket (13). When the level of liquid desiccant with water exceeds the height of the wall (27), it enters the interior side of the boundary formed by the wall (27), to then enter the container (8) through the holes (10) located at the lateral wall (11) thereof. A heating element (9) is located within the container (8), which heats the liquid desiccant with water, resulting in a process that boils the water. Approximately half of the water contained in the solution of liquid desiccant with water is extracted by this boiling.

The extracted water flows from the extraction chamber (2) toward the reservoir (5) through tube (6). Tube (6) enters the bottom of the extraction chamber (2), specifically, the space between the boundary formed by the wall (27) and the exterior side of the container (8), submerged in the volume of liquid desiccant with water. In this situation, tube (6) transfers heat to the liquid desiccant with water, thereby increasing the latter's temperature and, at the same time, decreasing the temperature of the evaporated water in tube (6) in order to condense it.

The evaporated water that flows through tube (6) is deposited in the tank (15). The liquid desiccant with water from the capture means (1) enters through tube (3) and flows around the tank (15), in the remaining volume of the reservoir (5). The liquid water deposited in the tank (15) that is still above ambient temperature can transfer heat to the liquid desiccant with water. After the liquid desiccant with water flows through the reservoir (5), it continues to flow through tube (3) toward the extraction chamber (2).

The tank (15) has a valve (16) through which liquid water can be extracted. The intake of the compressor (17) is connected to the tank (15), which creates a vacuum within the tank (15), and therefore suctions the evaporated water that flows through tube (6) and lastly creates negative pressure in the extraction chamber (2).

After water is boiled from the liquid desiccant with water in the container (8), the resulting solution is liquid desiccant, that is to say, it has a concentration of 50% $CaCl_2$ and 50% water. The liquid desiccant is expelled from the container (8) by the bubbles produced by boiling the water. The liquid desiccant flows through tube (4), due to the action of a pump (28) located along tube (4), toward the capture means (1). The suction produced by the pump (28) also allows for the pressure within the extraction chamber (2) to be kept at less than atmospheric pressure.

Water evaporates when the liquid desiccant with water is heated by means of heat transfer from the previously described mechanisms.

In this case, the extraction of water from the liquid desiccant occurs via boiling and evaporation.

When the liquid desiccant arrives at the capture means (1), the liquid desiccant captures water from the environment and the cycle described above is repeated.

The device comprises a level sensor (21) placed within the extraction chamber (2), which measures the level of liquid desiccant at the bottom of the extraction chamber (2). This measurement is then provided to the control device (7). When the level of liquid desiccant reaches the height of the container (8), the control device (7) activates the pump (28) for the purpose of suctioning liquid desiccant in order to make it flow through tube (4), and therefore decrease the level of liquid desiccant at the bottom of the extraction chamber (2).

The device comprises temperature sensors (19) placed in the extraction chamber (2), the reservoir (5), tube (3), tube (4) and tube (6), all of which are connected to the control device (7). With the information provided by the temperature sensors (19), the control device (7) can determine the amount of heat that must be provided by the heating element (9), which is also connected to the control device (7).

In this case, the pressure within the extraction chamber (2) is −53 kPa of gauge pressure or 47 kPa of absolute pressure, and the evaporation temperature of water is 80° C.

Heat and power are defined by:

$$Q = mC_e(T_{evap} - T_{input}); \text{ and}$$

$$P = \frac{Q}{t},$$

Thus, at the beginning of the process, the energy that the heating element (9) needs to provide is the amount of energy needed to increase the temperature of water from ambient temperature to 80° C., but once the normal operation of the device is achieved, the $T_{input}$ is equal to 70° C., and thus, the heating element (9) does not need to provide as much energy. Additionally, it is significant that the mass that the heating element (9) needs to heat is not the whole mass contained at the bottom of the extraction chamber (2), but only the mass contained between the interior of the container (8) and the heating element (9), and therefore, a lower amount of heat is required to boil the water. Moreover, the output of the heating element (9) varies according to the required extraction rate, which must be adjusted to the speed of the flow in the various tubes.

It must be understood that the present invention is not restricted to the modalities described and exemplified herein, and the person having ordinary skill in the art would understand that many other possible variations and modifications can be implemented which do not deviate from the spirit of the invention, which is only defined by the following claims.

The invention claimed is:

1. A device for extracting water from the environment, comprising:
   a means to capture water from the environment by means of a liquid desiccant;
   an extraction chamber comprising:
      a container located at the bottom of the extraction chamber, in which the water captured by the liquid desiccant is extracted, and
      a heating element located within the container;
   a first tube through which the liquid desiccant with water flows from the capture means to the extraction chamber;
   a second tube through which the liquid desiccant flows from the extraction chamber to the capture means;
   a reservoir to store water extracted from the liquid desiccant in the extraction chamber;
   a third tube through which the water flows from the extraction chamber to the reservoir;
   a means to create a vacuum within the extraction chamber; and a control device that controls the heating element, wherein the ratio of the internal volume of the heating element to that of the container is between 30% and 95%.

2. The device for extracting water from the environment of claim 1, wherein the capture means is an inclined tray through which the liquid desiccant flows.

3. The device for extracting water from the environment claimed in claim 1 characterized by the fact that the container in the extraction chamber has holes on the bottom part of its lateral wall, through which the liquid desiccant with water enters the interior of the container.

4. The device for extracting water from the environment claimed in claim 1 characterized by the fact that the internal shape of the container and the shape of the heating element are the same.

5. The device for extracting water from the environment claimed in claim 1 characterized by the fact that the boiling carried out within the container allows the liquid desiccant to exit through the top of the container.

6. The device for extracting water from the environment of claim 1 wherein the extraction chamber is double-jacketed, having an external jacket and an internal jacket, and further wherein:
the liquid desiccant with water flows between the external jacket and the internal jacket;
the internal jacket has holes on the bottom, through which the liquid desiccant with water flows toward the bottom of the extraction chamber; and
the evaporated water flows into the extraction chamber.

7. The device for extracting water from the environment of claim 1 wherein the extraction chamber is triple-jacketed, having an external jacket, an internal jacket and a second internal jacket, further wherein:
the liquid desiccant with water flows between the external jacket and the internal jacket;
the internal jacket has holes on the bottom, through which the liquid desiccant with water flows toward the bottom of the extraction chamber; and
the water that evaporates toward the top of the extraction chamber flows into the extraction chamber, where it then flows between the internal jacket and the second internal jacket to exit the extraction chamber.

8. The device for extracting water from the environment claimed in claim 1 characterized by the fact that a wall that runs along the periphery of the extraction chamber is located at the bottom of the extraction chamber.

9. The device for extracting water from the environment claimed in claim 1 characterized by the fact that the third tube enters the bottom of the extraction chamber, submerged in the liquid desiccant with water, and then exits toward the reservoir.

10. The device for extracting water from the environment claimed in claim 1 characterized by the fact that the first, second and third tubes are operationally arranged to configure a heat exchanger, wherein the second and third tubes transfer heat to the first tube.

11. The device for extracting water from the environment claimed in claim 1 characterized by the fact that the first and second tubes are operationally arranged to configure a heat exchanger, wherein the second tube transfers heat to the first tube.

12. The device for extracting water from the environment claimed in claim 1 characterized by the fact that the first and third tubes are operationally arranged to configure a heat exchanger, wherein the third tube transfers heat to the first tube.

13. The device for extracting water from the environment of claim 1 characterized by the fact that the means used to create a vacuum within the extraction chamber is a pump connected to the third tube.

14. The device for extracting water from the environment claimed in claim 1 characterized by the fact that the liquid desiccant is selected from the group consisting of glycols, $CaCl_2$) brine, $NaCl_2$ brine, or a combination thereof.

15. The device for extracting water from the environment claimed in claim 11, characterized by the fact that the concentration of $CaCl_2$) brine is:
between 25% and 35% in the solution of liquid desiccant with water; and
between 35% and 70% in the solution of liquid desiccant.

16. The device for extracting water from the environment of claim 1 wherein the reservoir contains a tank in which water is deposited, and in the volume between the tank and the rest of the volume of the reservoir, the liquid desiccant with water flows from the capture means and toward the extraction chamber.

17. The device for extracting water from the environment of claim 16, the tank in the reservoir further comprising:
a compressor connected to the tank in order to create a vacuum to suction gaseous fluids within the tank;
the third tube through connected to the tank which the water flows from the extraction chamber to the reservoir; and,
a valve connected to the tank to allow outflow of water deposited in the tank.

18. The device for extracting water from the environment of claim 16 wherein the tank in the reservoir comprises:
a fourth tube through which the water flows from the reservoir is connected to the tank;
a fifth tube through which the water flows to the reservoir is connected to the tank;
a valve connected to the tank to allow the outflow of water deposited in the tank;
a pump connected along the fourth tube; and
a Venturi tube, the input and the output of which are connected to the fourth tube and the fifth tube, respectively, and the high-velocity, low-pressure area of which is connected to the third tube.

19. The device for extracting water from the environment claimed in claim 18 characterized by the fact that the fourth tube enters the bottom of the extraction chamber, submerged in the liquid desiccant with water, and then exits toward the tank.

* * * * *